Sept. 3, 1963　　　R. G. BARTLETT, JR　　　3,102,537
RESPIRATORY APPARATUS
Filed March 7, 1961　　　　　　　　　　　　4 Sheets-Sheet 1
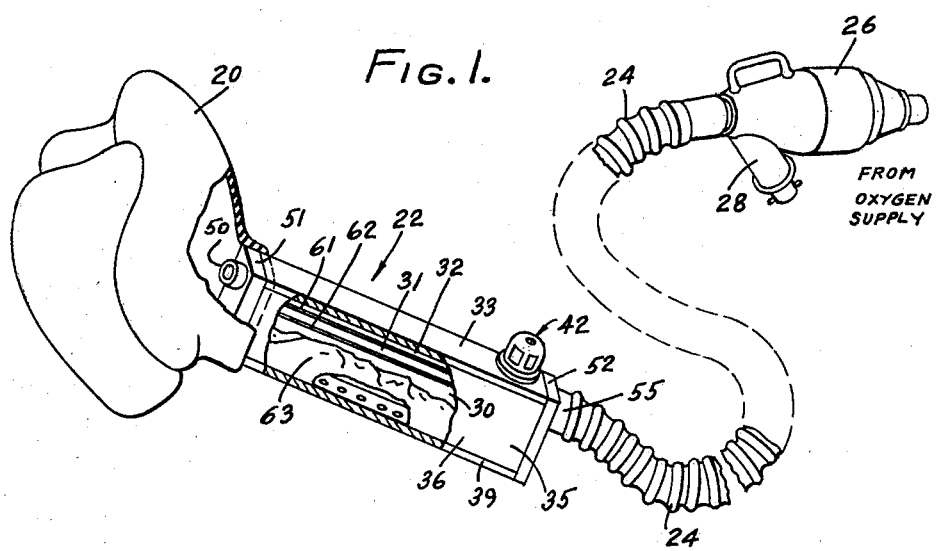
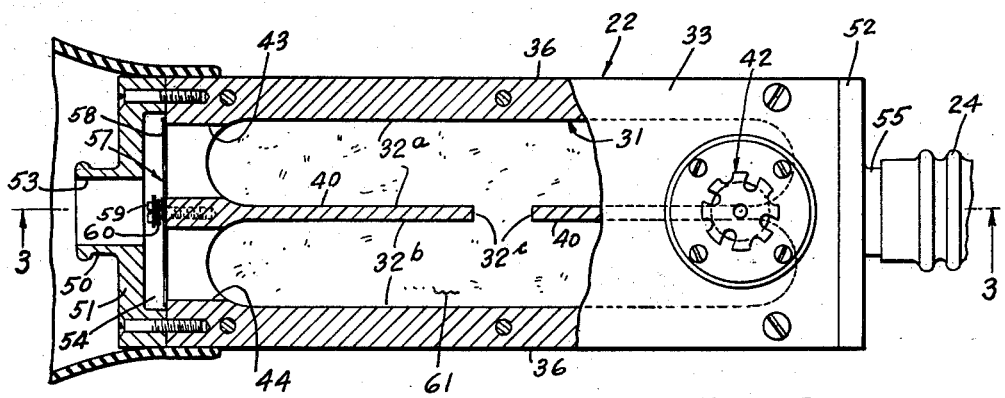
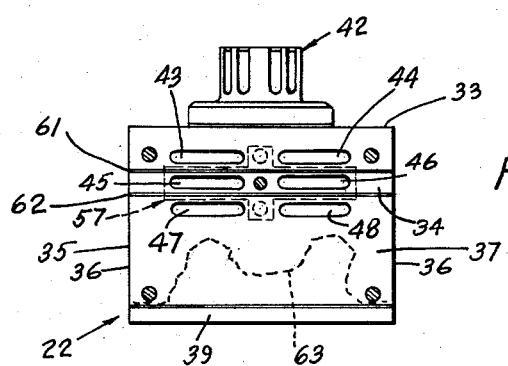
INVENTOR.
ROSCOE G. BARTLETT JR.
BY W. Glenn Jones
ATTORNEY Sept. 3, 1963     R. G. BARTLETT, JR     3,102,537
RESPIRATORY APPARATUS
Filed March 7, 1961     4 Sheets-Sheet 4
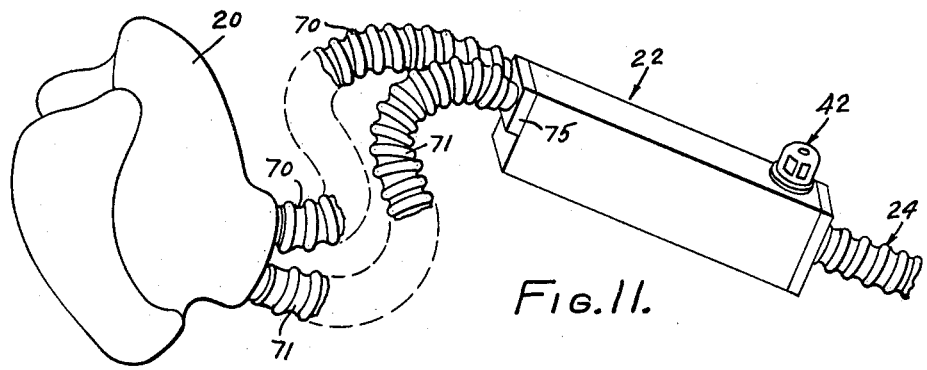
FIG.11.
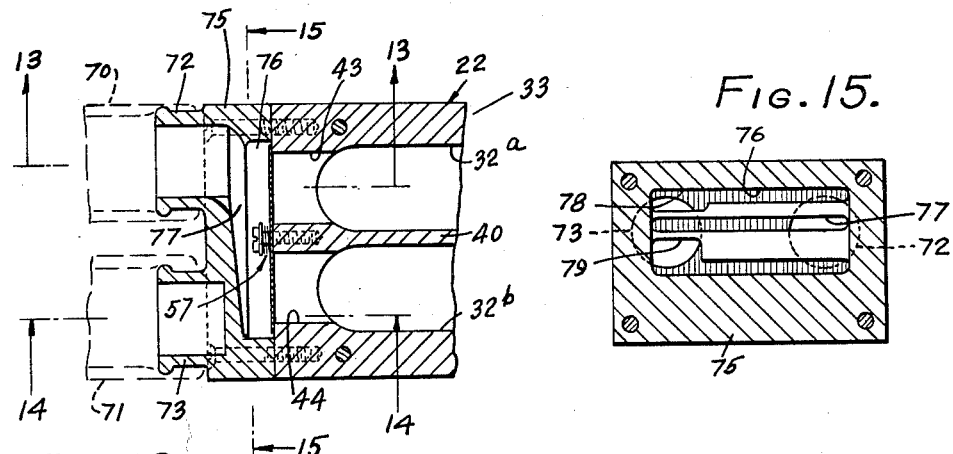
FIG.12.
FIG.15.
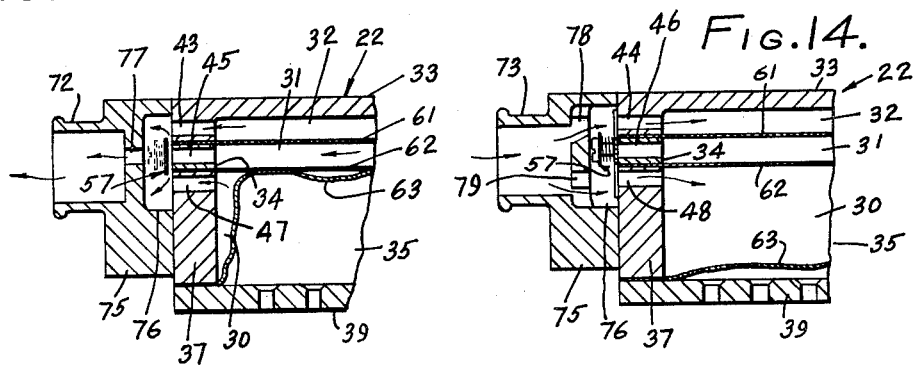
FIG.13.     FIG.14.
INVENTOR.
ROSCOE G. BARTLETT JR.
BY
ATTORNEY United States Patent Office 3,102,537
Patented Sept. 3, 1963

3,102,537
RESPIRATORY APPARATUS
Roscoe G. Bartlett, Jr., Lillian, Ala.
Filed Mar. 7, 1961, Ser. No. 94,089
7 Claims. (Cl. 128—142)
(Granted under Title 35, U.S. Code (1952), sec. 266)

The invention described herein may be manufactured and used by or for the Government of the United States of America for governmental purposes without the payment of any royalties thereon or therefor.

This invention relates generally to respiratory apparatus and particularly to an improved respiratory apparatus providing adequate moisture transfer from the expired to the inspired breath and affording maximum saving of the oxygen or other respirant supplied from an external source.

To prevent the freezing of valves, gauges and other gear associated with the storage of oxygen, both the liquid and compressed forms of this gas are supplied to the user in as dry a form as possible, i.e., all water or water vapor has been extracted. Although breathing of dry oxygen for a short time is without serious effects, prolonged breathing results in drying of the mucous membranes of the respiratory tract with accompanying discomfort, sore throat, and head colds. Where, at high altitudes or other perhaps clinical reasons, pure oxygen without air dilution must be supplied to a user, some means of humidifying the oxygen breathed by the user must be supplied. Such humidification could be accomplished by bubbling the oxygen through water, passing it through a water spray, or passing it through or over water containing material. Such means have the principal disadvantage that the moisture must be supplied from an external source which, with the necessary apparatus, increases the weight of the device and limits the duration of its use.

Another approach to the problem concerns the recycling of water from the moist expired breath to the dry incoming oxygen. This method has several merits. First, the device would be self-perpetuating in operation and obviously would be much lighter than if water were continuously supplied from an outside source. Second, in a small confined space, such as cockpit or space capsule, this method of recycling would be advantageous in maintaining low humidity of the atmosphere therein, thus preventing many of the problems associated with the condensation of water on the instruments or viewing ports.

In breathing, the gases comprising the last portion of an inspiration fill the anatomical dead space (non-respiratory air passages) and take little part, if any, in the gaseous exchange within the lungs. During the subsequent expiration, this dead space volume is the first volume of gas to be expired and is ordinarily lost for respiration purposes. This volume of gas, which may amount to approximately 160 ml. of pure oxygen or other respirant, may, however, be trapped and made to constitute the first part of the succeeding inspiration. This procedure should effect a considerable saving and conservation of the breathing oxygen. Prior art devices designed to accomplish this purpose have been unsuccessful generally because of the excess accumulation of moisture which soon filled the "rebreather" bag and made it useless. The excess accumulation of moisture occurred because no provision was made to utilize it in any manner. When the rebreather bag completely filled, it was necessary to manipulate a drain plug to empty it. Obviously, such procedures at high altitudes might be rather difficult of accomplishment.

The principal object of my invention, therefore, is to provide a respiratory apparatus which will efficiently incorporate the features of moisture transfer from expired to inspired breath and effect a considerable saving in the use of the limited supply of externally supplied respirant.

Another object of my invention is to provide a respiratory apparatus having means for moisture transfer from expired to inspired breath which means is self-priming and its functioning is not time limited nor dependent upon the supply and use of an expendable material.

Other objects and advantages of my invention will appear in connection with the following detailed description and the accompanying drawings wherein:

FIGURE 1 is a partially sectioned perspective view of the preferred embodiment of my invention;

FIG. 2 is a plan view of the principal respiratory member;

FIG. 4 is an end elevation taken on the line 4—4 of FIG. 3;

Figure 3:
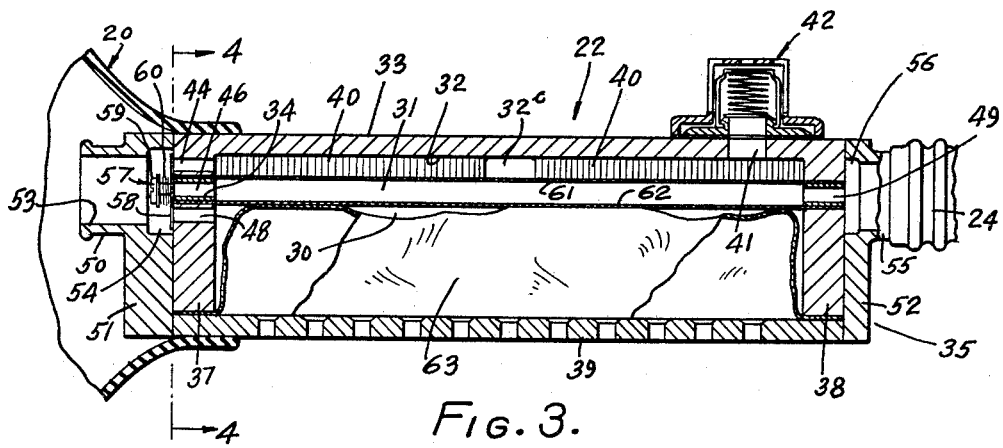
FIG. 3 is a sectioned side elevation of the part shown in FIG. 2 taken on line 3—3.

FIGS. 5–10, inclusive, are diagrammatic views illustrating the operation of my invention;

FIG. 11 is a perspective view of a modified form of my invention;

FIG. 12 is a partly sectioned plan view of the modified respiratory member shown in FIG. 11;

FIG. 13 is a partial side elevation taken on the line 13—13 of FIG. 12;

FIG. 14 is another partial side elevation taken on the line 14—14 of FIG. 12; and FIG. 15 is an end elevation taken on the line 15—15 of FIG. 12.

With reference to FIG. 1, my invention comprises the combination of a valveless mask 20, a principal respiratory member 22, a flexible tube 24 and an oxygen bottle connector 26. This latter connector part contains a standard loaded inspiratory valve (not shown) and a bleed 28 which may be used for the introduction of ambient air when the oxygen or other respirant supply is exhausted.

Mask 20 is a lightweight, shortened, valveless mask formed to fit closely to the face of the user and to the breathing end of the principal respiratory member 22. This mask is of more or less standard construction having means (not shown) for securing it to the head and face of the user. Having no valves, improved noiseless communications may result where a self-contained microphone unit (not shown) is provided in the side or cheek of the mask.

With reference to FIGS. 1–4, inclusive, the respiratory member 22 comprises a box-like structure defining, generally, three chambers or channels which may be designated as bellows chamber 30; inspiratory channel 31 and expiratory channel 32. This box-like structure consists of hollowed top lid portion 33, an intermediate separator or cheek 34, and a bottom portion 35 defining the bellows chamber 30. This bottom portion 35 may be constructed with sides 36, end pieces 37 and 38, and a perforated bottom plate 39.

The underside top lid portion 33 may be routed out, as shown in FIG. 2, to form two channel portions 32a, 32b, with a connecting channel 32c. Two downwardly projecting rib portions 40 are thus formed. An orifice 41 is provided in the top plate connecting the two channel portions 32a and 32b with the usual standard spring loaded expiratory check valve 42. Being of more or less standard construction, this valve will not be further described. Two oblong ports 43, 44 are cut in the mask end of this top lid portion which ports connect the channel portions 32a and 32b to the breathing connection and orifice 50.

The cheek or intermediate portion 34 may be formed from a plate of the material used generally in construction of the respiratory member and may be routed out, as shown, to provide a central, generally rectangular, cavity or bore which corresponds in size substantially to the combined cavities of the channels 32a and 32b. While this part could be constructed of separate pieces, two sides and two ends, it has been found preferable, due to the requirements of hermetically sealing all parts of the respiratory member, to form this cheek from one piece of material as described above. Two oblong ports 45, 46, are cut in the mask end of this cheek portion which correspond in size to the previously formed ports 43, 44, in the lid portion. While not shown in detail, two oblong ports 49 are cut in the oxygen supply end of this cheek portion 34 which correspond in size and location to the other end ports 45, 46.

The bottom portion 35 may be constructed, as previously indicated, from the two sides 36, end pieces 37, 38 and perforated bottom plate 39. End piece 37 has two oblong ports 47, 48 formed therein which ports correspond in size to those previously formed in the lid and cheek portions. Bottom plate 39 is drilled or otherwise provided with sufficient perforations to allow easy passage of ambient atmosphere to and from the bellows chamber 30.

External end pieces 51 and 52 are provided for making external connections to the respiratory member. End piece 51 is formed with a mask breathing connector 50 with a central bore 53 and an internal cavity or chamber 54. This cavity 54 is formed of a size to embrace all of the ports cut in the mask ends of the various lid, cheek, and bottom portions. External end piece 52 is formed with the oxygen supply connecter 55 and an internal cavity 56 which cavity is of a sufficient size to embrace the ports 49 cut in that end of the cheek portion 34.

The mask end of cheek portion 34, as shown in FIG. 2 and in phantom in FIG. 4, bears a light, flexible, spring loaded, check valve structure 57 which consists of a generally cruciform shaped, flexible plate 58, a central screw 59 and a light loading spring 60. The valve plate 58 covers only the ports 45, 46 in cheek portion 34 and is held in place by screw 59 and spring 60. The vertical tabs of the plate 58 may be pinned or otherwise secured to the lid and bottom portions, as indicated in FIG. 4, so as to prevent the inadvertent rotation of the valve plate and yet not to interfere with its check valve operation.

Tightly secured between the lid and cheek portions and between the cheek and bottom portions are the wicks or moisture transfer membranes 61, 62. These wicks define the inspiratory channel 31. While these wicks may be of any suitable porous material having capillary pores running through the thickness of the material, the most adaptable found to date from materials commercially available consist of disposable hand towels made from wood and rag fibers arranged non-directionally by a felting process. Most so-called wicking materials possessed longitudinal or horizontal capillaries running the length or breadth of the material, depending on how it was cut and installed. Preferably, a material designed for this purpose with all of its capillary pores normally disposed to its horizontal surfaces should be used for maximum moisture transfer. The paper towelling used, however, performed satisfactorily.

Tightly secured between the lower sides of the bottom portion 35 and the perforated plate 39 and extending into the bellows chamber 30 is the flexible, impervious bellows or diaphragm 63. This bellows must be of a size to completely fill the chamber 30 when it is expanded by atmospheric air and to press against and contact the lower surface of the lower wick 62. It must be impervious to air and moisture and must possess a high degree of flexibility and durability.

Figure 5:
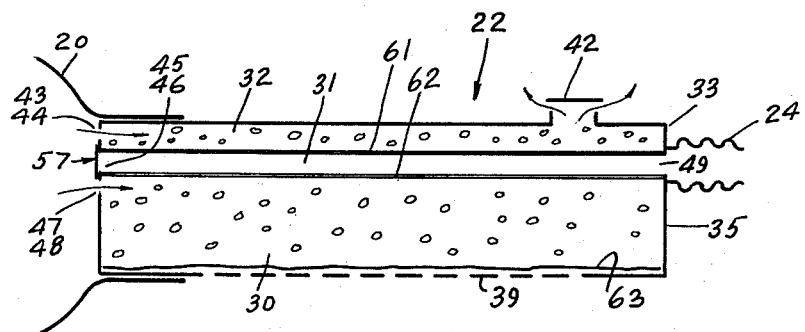
Figure 6:
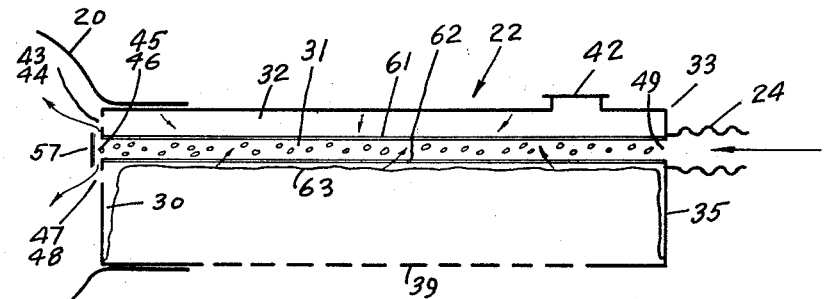

In now setting forth the operation of my improved respiratory apparatus, as thus far described, it should be noted that FIGS. 5 and 6 illustrate the moisture transfer features whereas FIGS. 7-10, inclusive, show the oxygen economizer features.

With reference to FIGS. 5 and 6, as the expiration commences and during the first part thereof, the bellows chamber 30 is filled with warm moist air through the ports 47, 48, collapsing the bellows 63 on to the upper surface of the bottom plate 39. The moisture immediately starts condensing on the walls of this chamber, on top of the bellows and on the lower surface of wick 62. As expiration continues, bellows chamber 30 being full, the warm moist air passes through upper ports 43, 44 into the expiratory channel 32, and, then, as this channel fills, the remainder of the expired air passes out through the expiratory valve 42 which is now opened. The moisture in this portion of the expired air condenses out on the walls of the lid portion and on the upper surface of wick 61. The rib portions 40 in the lid portion 33 not only provide additioal condensing surfaces but also support the upper wick 61 so that it will not be forced upwardly when pressurized inspiratory air is later admitted.

As inspiration commences, expiratory valve 42 closes and the moist air from chamber 30 and channel 32 are drawn into the lungs; bellows 63 is forced upwardly by the atmospheric air pressures against the lower surface of wick 62. Any moisture present on the upper surface of the bellows diaphragm due to condensation thereon or drainage from the walls of the bellows chamber 30 is thus transferred to the wick. As inspiration continues and the air is exhausted from the respiratory member, inspiratory valves in connector 26 and 57 open as the oxygen commences flowing to the mask through the inspiratory channel 31. As the oxygen flows through the channel, it picks up the moisture on the inner surfaces of the two wicks and is thus humidified. During the passage of the pressurized oxygen through the inspiratory channel, the upper wick is supported by the lid rib portions while the lower wick is supported by the expanded bellows. Due to the nature of the usable wicking material, these wicks, being wet and therefore perhaps structurally weak, must be properly and adequately supported.

It will be seen from the above that while some moisture will be discharged to atmosphere, a sufficient quantity will be recycled to provide the needed humidity for the dry respirant without allowing any accumulation of moisture to interfere with the proper operation of the respiratory apparatus. It will be observed that my improved apparatus is thus moisture self-priming and self-perpetuating and is not dependent on any external supply of moisture or humidifying materials.

While not specifically mentioned, heretofore, it should be obvious that check valve 57 operates chiefly to prevent expiration air from entering the inspiratory channel 31 and tube 24 leading to the respirant supply. Failure to include this valve 57 would result in $CO_2$ rich air filling the inspiratory channels which, in turn, would result in (1) allowing excess moisture to collect in tube 24, and (2) not expurgate enough $CO_2$. With this valve installed, the inspiratory channels are kept clear of moisture, other than that present on the wicks, and the last part of the $CO_2$ rich expiration is expelled through the expiratory valve 42.

Figure 7:
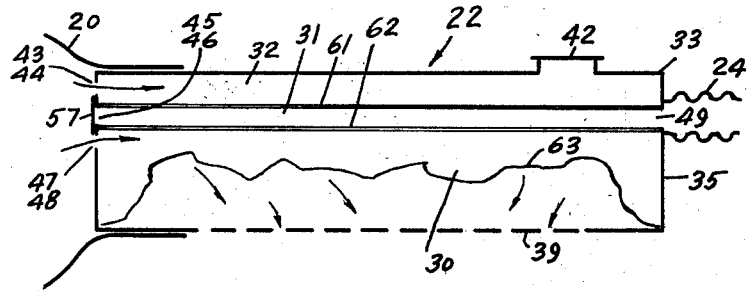
Figure 8:
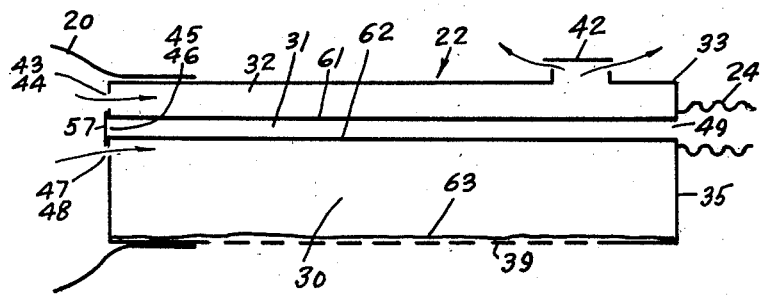

With reference to the oxygen or respirant economizer functions, FIG. 7 illustrates the beginning of expiration. All valves are closed. Oxygen rich air from the anatomical dead space is filling the bellows chamber, principally, and the bellows is collapsing onto the bottom plate 39. When chamber 30 is completely filled, the latter part of the expiration fills the expiratory channel 32 and then opens the expiratory valve for the expulsion of the $CO_2$ rich portion of the expired breath. This condition is indicated in FIG. 8.

Figure 9:
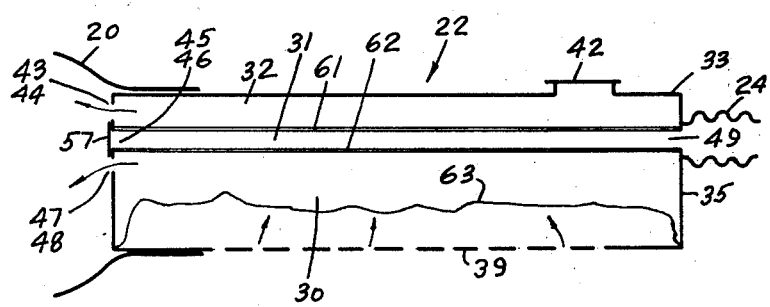
Figure 10:
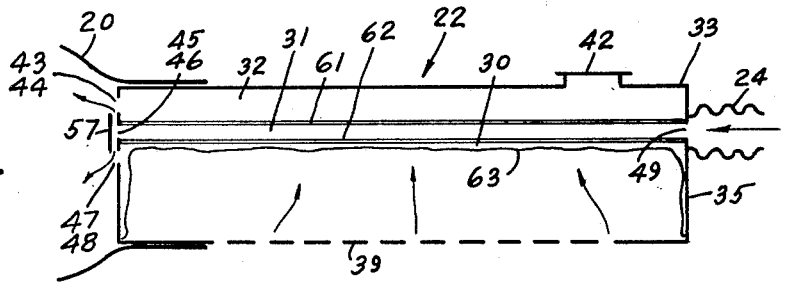

As inspiration commences, FIG. 9, the expiratory valve 42 closes and the oxygen rich air from chamber 30 is mixed with the expired air from channel 32, and is drawn into the lungs. Bellows 63 starts to expand upwardly as atmospheric air is drawn in through the perforations in plate 39. As the oxygen rich air is exhausted from the respiratory member, the inspiratory valves open and oxygen or other respirant is drawn from the supply tank, as shown in FIG. 10. Bellows 63 is expanded against the lower surface of wick 62, thus all of the oxygen rich air previously present in chamber 30 is forced out into the useful lung spaces.

Since in the average adult person the anatomical dead space is approximately 160 ml. and the tidal volume is approximately 640 ml., at least 25% of the oxygen per breath cycle will be saved, providing, of course, the volumes of the chamber 30 and channels 32 are made sufficiently large. Actually, these volumes usually amount to 250–300 ml. Obviously such economization of the oxygen or respirant supply substantially increases the period of use.

It should be noted here, that with the apparatus thus described, no added anatomical dead space is provided. Under certain circumstances and for certain users, an added anatomical dead space has been found to be of great benefit. Such arrangements have been described by me elsewhere. For the purpose here intended, i.e. maximum recycling of the moisture from the lungs and the maximum amount of oxygen to be saved, added anatomical dead space would tend to inhibit such maximal requirements.

Where, for one reason or another, the close location of the respiratory member with the mask as shown in FIG. 1 and previously described is found undesirable, the respiratory member can be located more conveniently on the seat, cockpit wall, or instrument panel, providing it be connected to the mask with a double lumen breathing tube. Certain modifications in the respiratory member will be required to effect this change and such modifications are illustrated in FIGS. 11–15, inclusive.

FIG. 11 shows the mask 20 connected by two flexible tubes 70, 71 to the respiratory member 22 with its expiratory valve 42. Flexible tube 24 to the oxygen supplied is also shown.

The principal modifications occur in the mask end piece 75 which has replaced the former end piece 51. Here, a new valving or distribution arrangement has been provided so that, due to the difference in flow rates in the tubes 70, 71, these tubes will not act as an added anatomical dead space.

With reference to FIGS. 12–15, inclusive, end piece 75 bears externally two connectors 72 and 73 which are connected, respectively, to the tubes 70 and 71.

Internally, end piece 75 is provided with a first cavity 76 which is similar in size and shape to cavity 54 formed in end piece 51. As before, this cavity 76 is of a size to embrace all three sets of ports as shown in FIG. 4. Additional ports are then cut leading from this cavity 76 into the connectors 72 and 73. As shown in FIG. 13, a single port 77 is cut into the bore of connector 72 and, FIG. 14, two ports 78 and 79 are cut into the bore of connector 73. The check valve 57 functions as described previously.

As the breath is expired, due to the difference in port size, the pressure builds up in tube 70, thus trapping a certain amount of oxygen rich air and the remainder passes into chamber 30 and then into expiratory channel 32 and out through the expiratory valve 42. Upon inspiration, the air in both tubes is drawn into the lungs until tubes and the respiratory chamber are exhausted and the inspiratory valves open. The moisture transfer functions remain as previously described.

While not previously mentioned, it is understood that all parts of the respiratory member are assembled so as to be hermetically sealed in all respects. The various parts may be assembled with adhesives or a combination of sealants and screws as variously indicated throughout the views.

Having thus described and illustrated a preferred embodiment of my invention and an important modification thereof, I do not intend to be limited thereby. Those skilled in the art may perceive many modifications which will still fall within the spirit of my invention and the scope of the appended claims wherein I claim:

1. A respiratory apparatus for users of dry pressurized respirant comprising, in combination:
    a valveless mask adapted to sealingly cover the openings to the respiratory passages of a user and to conduct moist expired and inspired fluids therefrom and thereto;
    a source of dry pressurized respirant;
    a respiratory member interposed between said mask and said source of respirant;
    a first connection means connecting said mask to said respiratory member;
    a second connection means connecting said source to said respiratory member;
    an expiratory check valve associated with said respiratory member for controlling the flow of expired fluid to atmosphere;
    a first inspiratory check valve associated with the source end of said second connection for controlling the flow of respirant from said source;
    a second inspiratory check valve associated with said respiratory member for controlling the flow of fluids therethrough;
    a chamber in said respiratory member open only to said first connection means for collecting the first respirant rich portion of expired fluid and condensing the moisture therefrom;
    a first channel in said respiratory member having openings at both ends to both first and second connections for conducting a controlled flow of inspired respirant therethrough;
    a second channel in said respiratory member open only to said first connection for conducting the latter portions of said expired fluid to said expiratory check valve and for condensing moisture from the moist expired fluid therein; and
    moisture transfer membranes in said respiratory member interposed between said chamber and channels for transferring the moisture condensed in said chamber and second channel to the dry respirant passing through said first channel.

2. Respiratory apparatus as claimed in claim 1 wherein said chamber is defined by rigid end and side walls, a top or inner wall consisting of one of said moisture transfer membranes, a first bottom or outer wall consisting of a flexible bellows diaphragm and second bottom or outer wall consisting of a rigid perforated plate, said bellows diaphragm being hermetically sealed and secured between the bottoms of said end and side walls and said plate.

3. A respiratory apparatus as claimed in claim 1 wherein said respiratory member is further characterized as having means for supporting said moisture transfer membranes against distortion by the pressure of said dry respirant passing through said first channel.

4. A respiratory apparatus as claimed in claim 1 wherein said chamber in said respiratory member is further characterized by possessing means to expel the moisture condensed therein to the chamber side of the moisture transfer membrane associated therewith.

5. A respiratory apparatus as claimed in claim 1 wherein said first connection means comprise a pair of flexible tubes having differentially sized orifices leading into said respiratory member.

6. The method of promoting the health and well being of a user of dry pressurized respirant and economizing in the use of said respirant comprising:
    trapping the first respirant-rich portion of the moist expired breath of said user;
    condensing and collecting moisture therefrom;
    conducting the later $CO_2$ rich portions of said moist expired air to atmosphere;
    condensing and collecting moisture therefrom;
    conducting the trapped portion of the respirant-rich moist expired breath to the user as the first portion of the inspired breath;

conducting a controlled amount of respirant as the later portions of said inspired breath; and transferring all of the moisture condensed and collected from said moist expired breath to said dry pressurized respirant.

7. A respiratory apparatus for users of dry pressurized respirant comprising, in combination:

a valveless mask adapted to sealingly cover the mouth and nose of a user and to conduct moist expired and inspired fluids from and to the lungs of the user;

a source of dry pressurized respirant;

a tubular flexible connection means connected to and leading from said source;

a first inspiratory check valve in said flexible connection means adjacent said source; and a respiratory member interposed between said mask and said connection means and connected thereto; said respiratory member including a dual purpose chamber for collecting moisture condensed from said moist expired fluid and for trapping the first respirant-rich portion of the expired fluid from said user;

a first channel for conducting pressurized respirant therethrough;

a second inspiratory check valve associated with said first channel for permitting respirant to pass therethrough and prohibiting the influx of expired fluids therein;

a second channel for the flow of expired fluids;

moisture transfer membranes interposed between said chamber and said first channel and between said first and second channels whereby moisture condensed from said moist expired fluid in said chamber and said second channel may be transferred to the dry pressurized respirant passing through the said first channel; and an expiratory valve associated with said second channel for permitting a controlled flow of expired fluid to ambient atmosphere.

References Cited in the file of this patent

UNITED STATES PATENTS

| | | |
|---|---|---|
| 2,387,123 | Deming | Oct. 16, 1945 |
| 2,610,038 | Phillips | Sept. 9, 1952 |
| 3,005,453 | Wellenstein et al. | Oct. 24, 1961 |

FOREIGN PATENTS

| | | |
|---|---|---|
| 1,121,482 | France | Apr. 30, 1956 |